Jan. 24, 1956 — A. D. NOLAN — 2,731,885
ROCKET STOWAGE AND LAUNCHING MECHANISM
Filed Aug. 30, 1952 — 3 Sheets-Sheet 1
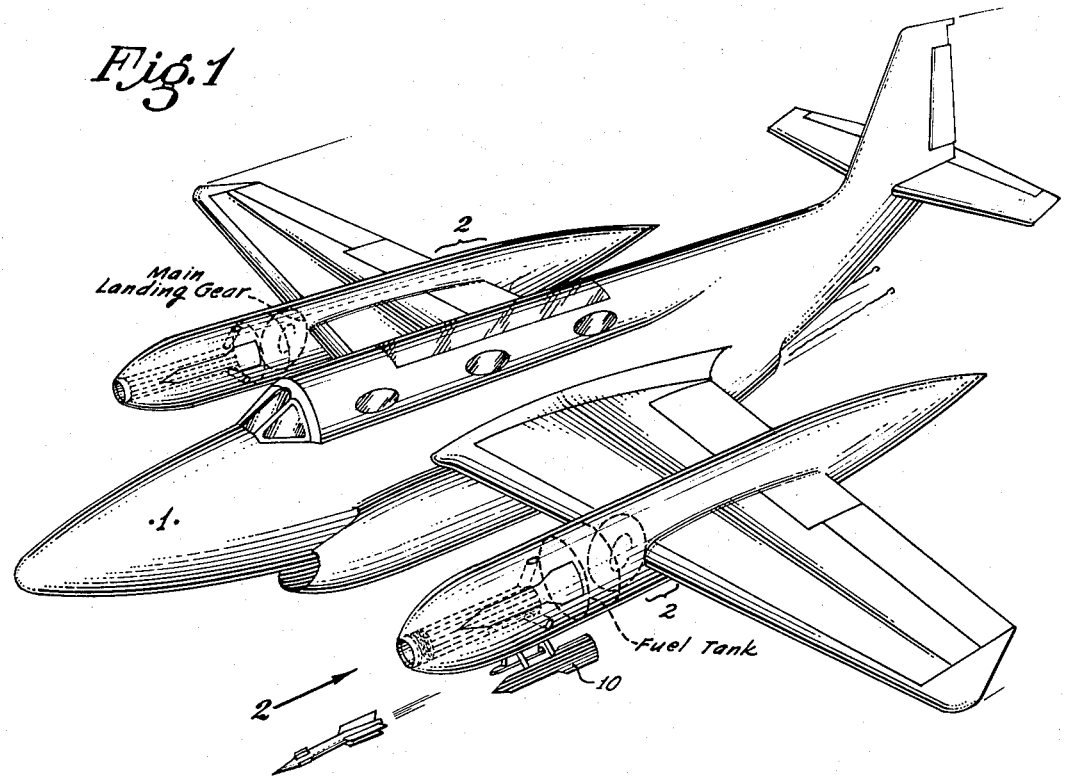
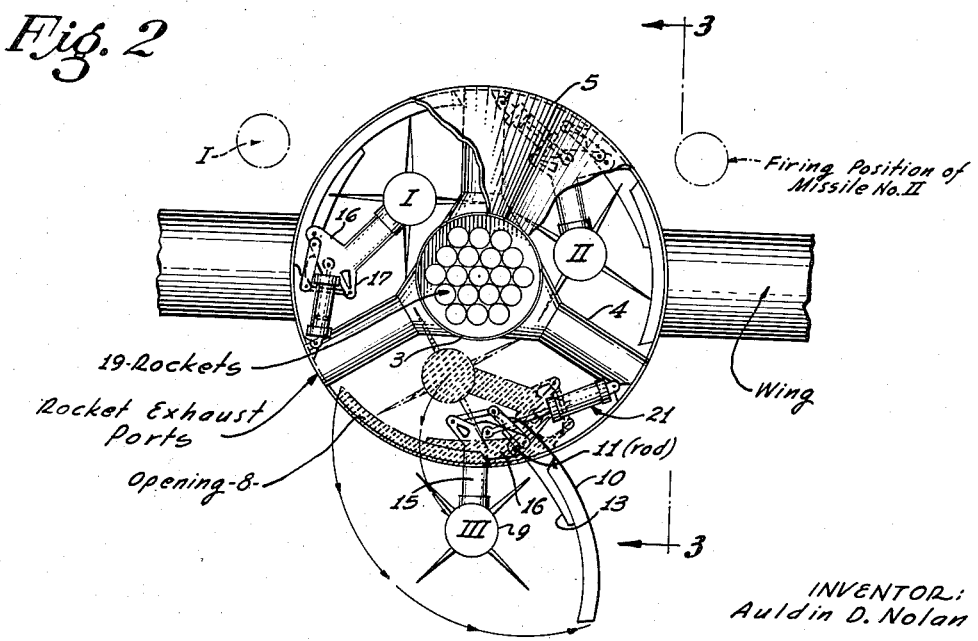
INVENTOR:
Auldin D. Nolan
By Herbert E. Metcalf
His Patent Attorney Jan. 24, 1956 — A. D. NOLAN — 2,731,885
ROCKET STOWAGE AND LAUNCHING MECHANISM
Filed Aug. 30, 1952 — 3 Sheets-Sheet 2

INVENTOR
Auldin D. Nolan

His Patent Attorney

Jan. 24, 1956

A. D. NOLAN 2,731,885

ROCKET STOWAGE AND LAUNCHING MECHANISM

Filed Aug. 30, 1952

INVENTOR:
Auldin D. Nolan

By Herbert E. Metcalf
His Patent Attorney

United States Patent Office 2,731,885
Patented Jan. 24, 1956

2,731,885

ROCKET STOWAGE AND LAUNCHING MECHANISM

Auldin D. Nolan, Palos Verdes, Calif., assignor to Northrop Aircraft, Inc., Hawthorne, Calif., a corporation of California Application August 30, 1952, Serial No. 307,280

6 Claims. (Cl. 89—1.7)

This invention relates to a rocket launching device and more particularly to a rocket launching device in which a plurality of rockets are stowed within a streamline portion of an airplane and subsequently moved into firing position.

In military planes it is conventional practice to mount rockets or missiles on the underside of its wings with their axis parallel with the longitudinal center line of the plane. This method of mounting increases the frontal area of the airplane and materially increases its parasite drag.

It is, therefore, an object of the present invention to provide a rocket launching device, for a plurality of rockets, in which the parasite drag is reduced to a minimum.

A further object is to provide a simple and efficient rocket launching device in which the rockets are pivotally moved from their stowed or normal position into a firing position.

A further object is to provide a streamline structure in which rockets are mounted in close proximity with the walls of the structure so that they occupy a minimum of space, however, when moved to their firing position clearance between the rockets and walls of the structure is increased to provide an unobstructed forward path of flight for the rocket.

Other objects and advantages of this invention will be apparent from the following description forming a part of this specification, but the invention is not limited to the embodiment herein described, as various forms may be adopted within the scope of the appended claims.

Throughout the specification and claims of the present application the word "rocket" includes both guided and unguided reaction-driven or self-propelled missiles.

The invention may be more fully understood by reference to the accompanying drawings, wherein:

Figure 1 is a perspective view of an airplane having wing pods in which one embodiment of the rocket launching device of the present invention is utilized.

Figure 2 is a front elevational view of the embodiment of the rocket launching device of Figure 1 viewed as indicated by arrow 2, its outer surface partly broken away to show its construction.

Referring to Figure 1, a jet-driven airplane 1 is fitted with rocket and fuel pods 2, the forward portion being utilized for mounting rockets while engine fuel is carried in the aft portion. Rocket tubes, of the character disclosed in application Serial No. 303,381 dated August 8, 1952 may also be mounted in the forward portion of the embodiment shown in Figures 1 to 3 inclusive. When rockets are so mounted, interiorly of cylinder 3, their gases are exhausted to the atmosphere through laterally arranged tubes 4.

Figure 3:
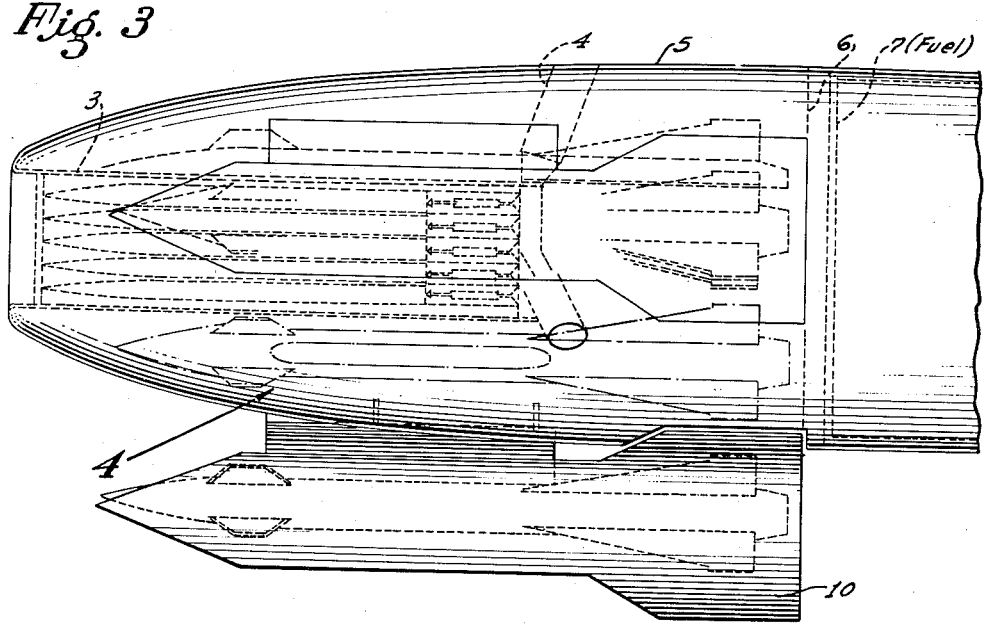
Figure 3 is an elevational view of the rocket launching device as shown in Figure 1, viewed from the line 3—3 of Figure 2.

The forward portion of pods 2, shown in Figures 1 to 3 inclusive, comprises inner and outer generally concentric cylinders 3 and 5, joined at their forward ends to provide a streamline contour. The outer cylindrical surface of the fore and aft portions of pods 2 are continuous, thus providing a streamline surface. A heat resisting bulkhead or firewall 6 is positioned between the fore and aft portions of the pods to protect fuel in tank 7 from heat of the exhaust gases discharged by rockets fired within the inner cylinder.

The outer cylinder 5 of the pods is provided with a plurality of circumferentially spaced openings 8, three such openings being shown in the present embodiment. The openings 8 are generally arrow shaped to permit a rocket 9, having fixed directional vanes, to freely pass therethrough.

Each opening 8 is provided with a cover 10, capable of closing the openings and maintaining a flush relationshipship with the outer surface of the forward portion of pods 2 in its closed position, as best seen in Figures 2 and 3.

Figure 4:
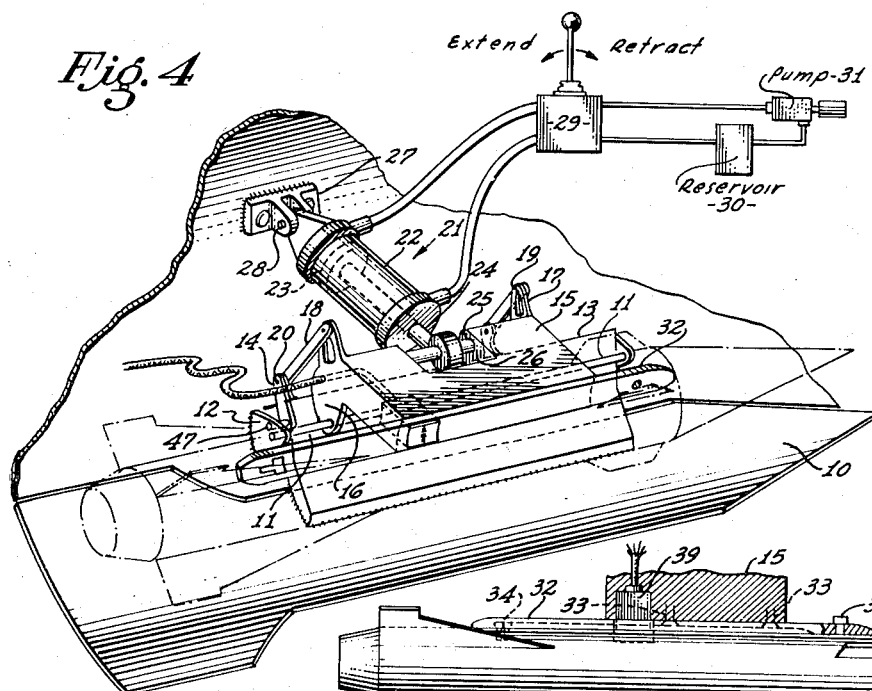
Figure 4 is a detail view showing the operating and release mechanism of the embodiment of the rocket launching device of Figures 1 to 3 inclusive.
Figure 5:
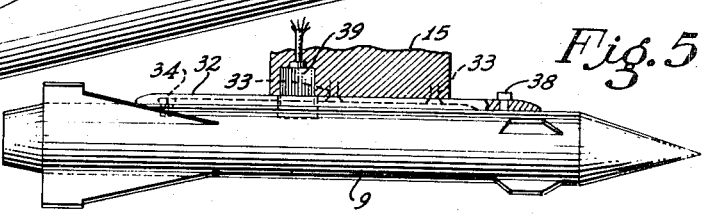
Figures 5 and 6 are detail views of the release mechanism of the embodiments of the rocket launching devices of Figures 1 to 3, inclusive, also Figures 7 and 8.

To provide for pivotal movement of the cover 10, between its open and closed position as shown in Figures 2 and 4, a plate element 13 is secured to its central portion. Hinge pins 47 fixedly secured to element 13, extend longitudinally from each end thereof and are pivotally supported inwardly of the inner surface of cylinder 5 by means of lugs 12 positioned at each end of plate element 13. Arm members 14, fixedly secured and generally in the plane of plate 13, extend from adjacent each end thereof for a purpose to be presently disclosed.

A rocket or missile is releasably attached to a generally rectangularly shaped rocket mount 15 by a launching beam in a manner to be described later. A pair of arm elements 16 extending at right angles to a longitudinal face of the mount, adjacent its end portions most remote from the rocket, provides means for pivotally supporting the mount. A rod 11 passes through elements 16 and extends from each side thereof and is pivotally supported in the lugs 12. It should be noted that the pivot points for cover 10 and mount 15 are not coincident, the pivot point of the mount being nearer the longitudinal center line of the rocket for a purpose which will be apparent later. Extending obliquely from the other side of mount 15 is a pair of ear members 17. Link members 18 extend between members 17 of the mount and arm members 14 plate element 13 and are pivotally attached thereto by means of hinge pins 19 and 20 respectively.

A hydraulic actuator 21 is utilized to pivotally move the rocket from its stowed position to its firing position. The actuator comprises a conventional cylinder 22, piston 23 and piston rod 24. Piston rod 24 extends from one end of cylinder 22 and is pivotally mounted on a rod extending between the side walls of a slot 26 formed at the mid-portion of rocket mount 15. The other end of cylinder 22 is pivotally attached to the inner wall of cylinder 5 by means of bracket 27 and hinge pin 28. Hydraulic fluid is supplied to cylinder 22 by means of a conventional system comprising a valve 29, reservoir 30, and pump 31, connected by suitable conduit, as shown in Figure 4; the valve of the above system being accessible for pilot control.

Figure 6:
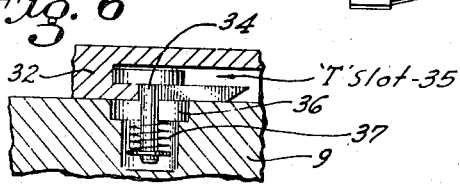

The rocket, in the present embodiment, is releasably attached to the rocket mount 15 by means of a rectangular shaped launching beam 32 secured to the mount, as by means of screws 33, with its longitudinal axis extending lengthwise of the mount. A bolt shaped retaining element 34 extends from the cylindrical surface of rocket 9 with its head extending into a T-shaped slot 35 which is open at its lower-most part adjacent the underside of launching beam 32, as shown in Figure 6. The shank portion of element 34 extends through the wall of rocket 9, its head portion being urged into counterbore 36, in a rocket wall, by means of a spring 37 when it is not in position in T-slot 35. To mount a rocket, the head portion of element 34 is withdrawn from counterbore 36 and placed in T-slot 35 of the launching beam, said element supporting the major portion of the weight of rocket 9 as it is located near its center of gravity. A shear pin 38, provided with a head, extends through the forward end of launching beam 32 and is secured to the rocket to support a small portion of its weight and maintain the rocket in longitudinal alignment.

Umbilical connector plug 39 provides electrical contact with the rocket or missile 9, electrical signals being transmitted to the rocket through the connector plug including electrical contact for firing.

In operation, a rocket is fired by first pivotally moving it from a stowed position, designated by numerals I and II of Figure 2, to its firing position, indicated by numeral III of the same figure. This is accomplished by means of actuator 21, a movement of the actuator piston causing mount 15, launching beam 32, and rocket 9 to pivot about the axis of rod 11. As the rocket mount and cover 10 are linked together by memebers 18 a pivotal movement of mount 15 produces a simultaneous pivotal movement of the cover. However, a differential motion occurs between the rocket 9 and cover 10 as they do not pivot about the same axis, the cover traveling through an arc of greater magnitude than the rocket. Accordingly the clearance between the rocket and cover in their firing position exceeds their clearance in the stowed position of the rocket, clearly shown in Figure 2. The above movement of rocket and cover not only provides an unobstructed forward path of flight for the rocket but also allows a plurality of rockets to be stowed in a smaller space than would otherwise be possible.

As thrust of the rocket's exhaust gases causes it to move forward, pin 38 is sheared off flush with the surface of the rocket and the head of element 34 is drawn from T-slot 35. As element 34 leaves the T-slot, spring 37 urges its head portion into counterbore 36, leaving the rocket's surface free of any of its securing elements. After firing the rocket mount and cover are returned to their normal position and the rod again presents a streamlined surface.

Figure 7:
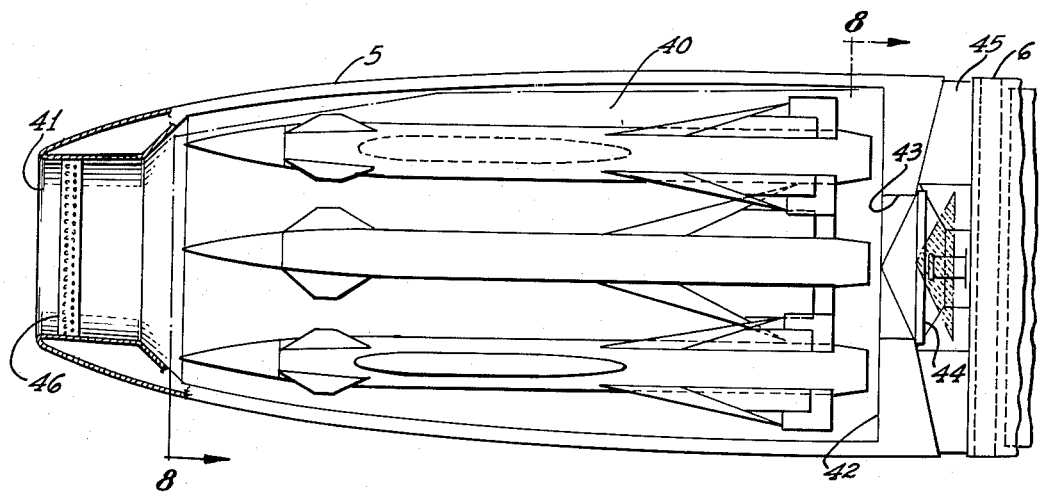
Figure 7 is a sectional view of another embodiment of the present invention taken on the line 7—7 of Figure 8.
Figure 8:
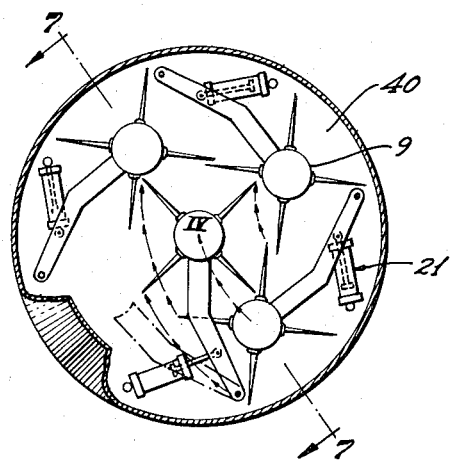
Figure 8 is a sectional view of the rocket launching device of Figure 7 taken on the line 8—8 thereof.

In the modification shown in Figures 7 and 8, the rockets are pivoted to a central position for firing, as indicated by numeral IV of Figure 8. Identical elements are identified by the same numerals used in the embodiment shown in Figures 1 to 3 inclusive. As the two embodiments are similar in operation a detailed description of its various parts is not deemed necessary. Rocket stowage chamber 40, of the present embodiment, has a circular opening 41 in its forward end and is closed at its aft end by a radially extending wall 42, except for a centrally located circular aperture 43, which is normally closed by a spring urged poppet type valve 44. Exhaust gases from a fired rocket forces valve 44 from its seat and allow the gases to escape through lateral passageways 45 to the atmosphere. A frangible plastic muzzle plug 46 closes opening 41. The first rocket fired breaks plug 46 to provide free passage for subsequently fired rockets.

As the valve 44 closes aperture 43, except when a rocket is fired, air cannot flow through chamber 40 and drag due to such a flowing stream of air is eliminated.

From the above description it will be apparent there is provided an efficient rocket launching device, particularly for airplanes, in which rockets are compactly stowed within a streamline portion of a plane and pivotally moved therefrom into a firing position.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A rocket launching device comprising: a generally cylindrical streamlined shell; wall portions of said shell defining a plurality of circumferentially spaced openings therein; an individual cover associated with each of said openings; each of said covers being pivotally mounted to said shell and movable between a closed position closing one of said openings with which it is associated and an open position spaced externally from said shell; a plurality of rocket launching beams pivotally mounted to said shell; each of said beams having a first position within said shell adjacent respective different ones of said openings and covers when the latter are in said closed positions; each of said beams being movable from said first position through said adjacent openings to second positions located externally of said shell; means for moving said beams between said first and second positions thereof; and linkage means pivoted to and extending between said beams and covers to move the latter between said open and closed positions thereof simultaneously with the movement of said beams; said covers traveling through a greater arc in moving between their said open and closed positions than said beams in moving between their said first and second positions.

2. A rocket launching device as set forth in claim 1, further characterized in that relative distances between said beams and said respective adjacent covers are less when said beams and covers are in said first and closed positions, respectively, than when said beams and covers are in said second and open positions, respectively.

3. A rocket launching device as set forth in claim 1, further characterized in that the axes about which said beams and said respective adjacent covers pivot are spaced apart so that the distance between the pivotal axis of said cover and the axis about which said linkage means pivots on said beams increases during the movement of said beams from said first to said second positions thereof.

4. A rocket launching device comprising: a generally cylindrical streamlined shell; wall portions of said shell defining an opening in the wall of said shell; a cover for said opening pivotally mounted on said shell and movable between a closed position closing said opening and an open position spaced externally from said shell; a rocket launching beam pivotally mounted on said shell and having a first position within said shell adjacent said opening and cover when the latter is in said closed position; said beam being movable from said first position through said opening to a second position located externally of said shell; means for moving said beam between said first and second positions thereof; and linkage means pivoted to and extending between said beam and cover to move the latter between said open and closed position thereof simultaneously with the movement of said beam; said cover moving through a greater arc in moving between said open and closed position thereof than said beam in moving between said first and second position thereof.

5. A rocket launching device as set forth in claim 4, further characterized in that relative distances between said beam and said cover are less when said beam and cover are in said first and closed positions, respectively, than when said beam and cover are in said second and open positions, respectively.

6. A rocket launching device as set forth in claim 4, further characterized in that the axes about which said beam and cover pivot are spaced apart so that the distance between the pivotal axis of said cover and the axis about which said linkage means pivots on said beam increases during the movement of said beam from said first to said second position thereof.

References Cited in the file of this patent

UNITED STATES PATENTS

| | | |
|---|---|---|
| 2,105,055 | Saunders | Jan. 11, 1938 |
| 2,409,210 | Jolly | Oct. 15, 1946 |
| 2,481,542 | Schuyler | Sept. 13, 1949 |
| 2,585,030 | Nosker | Feb. 12, 1952 |
| 2,599,555 | Hurt | June 10, 1952 |
| 2,608,132 | Lauritsen | Aug. 26, 1952 |
| 2,634,656 | Woolens et al. | Apr. 14, 1953 |

FOREIGN PATENTS

| | | |
|---|---|---|
| 428,934 | Great Britain | May 15, 1935 |